United States Patent [19]

Takahashi

[11] Patent Number: 5,584,753
[45] Date of Patent: Dec. 17, 1996

[54] DEVICE FOR FIXING TOOL ELEMENT TO ROTARY TOOL

[75] Inventor: Yuji Takahashi, Anjo, Japan

[73] Assignee: Makita Corporation, Anjo, Japan

[21] Appl. No.: 416,194

[22] Filed: Apr. 4, 1995

[30] Foreign Application Priority Data

Apr. 6, 1994 [JP] Japan .................................... 6-068668

[51] Int. Cl.⁶ .................................................. B24B 45/00
[52] U.S. Cl. ........................... 451/342; 451/359; 451/548
[58] Field of Search ..................................... 451/342, 359, 451/360, 541, 548, 507, 508, 510, 259

[56] References Cited

U.S. PATENT DOCUMENTS

| | | | |
|---|---|---|---|
| 2,867,953 | 7/1958 | Kennerty | 451/342 |
| 3,470,655 | 6/1967 | Swigert | 451/342 |
| 3,795,931 | 3/1974 | Martino | 451/342 |
| 5,020,280 | 6/1991 | O'Reilly | 451/359 |
| 5,177,830 | 1/1993 | Montabaur et al. | 451/342 |
| 5,201,785 | 4/1993 | Nagano | 451/508 |
| 5,259,145 | 11/1993 | Fushiya et al. | |

FOREIGN PATENT DOCUMENTS

| | | |
|---|---|---|
| 0636455 | 2/1995 | European Pat. Off. . |
| 2156770 | 5/1973 | Germany . |
| 7304870 | 5/1973 | Germany . |
| 3613987 | 10/1987 | Germany . |
| 39-31638 | 10/1939 | Japan . |

Primary Examiner—Bruce M. Kisliuk
Attorney, Agent, or Firm—Dennison, Meserole, Pollack & Scheiner

[57] ABSTRACT

A device for fixing a tool element to a spindle of a rotary tool includes a first rotary member and a second rotary member adapted to be mounted on the spindle in a confronting relationship with each other in an axial direction of the spindle. The second rotary member has an abutting surface for abutment of the tool element on the side opposite to the first rotary member. A resilient member is interposed between the first rotary member and the second rotary member. A tightening member is operable to press the tool element on the second rotary member with the first rotary member abutted on a part of the spindle.

3 Claims, 5 Drawing Sheets

DEVICE FOR FIXING TOOL ELEMENT TO ROTARY TOOL

BACKGROUND OF THE INVENTION

1. Field of the Invention

The present invention relates to a device for fixing a tool element such as a disc-like grinding wheel, a cutting wheel and a wire brush to a spindle of a rotary tool such as a grinder, a sander and a polisher.

2. Description of the Prior Art

A conventional fixing device includes a flange member mounted on an end portion of a spindle of a rotary tool. With a tool element abutted on the flange member, a lock nut is engaged with the spindle and is tightened to clamp the tool element between the lock nut and the flange member, so that the tool is fixed in position perpendicular to the spindle.

However, with the conventional clamp device, both the flange member and the lock nut are made of rigid material, so that vibrations of the rotary tool produced during the operation is directly transmitted to an operator. Further, noises are produced by the vibrations and are amplified during transmission. This may provide an undesirable operation feeling to the operator.

In order to solve this problem, Japanese Utility Model Publication No. 39-31638 proposes "Noise Prevention Device" in which a tool element is clamped between a flange member and a lock nut with resilient members interposed between the flange member and the tool element and between the lock nut and the tool element, respectively. With this construction, vibrations of the tool element are absorbed by the resilient member, so that the vibrations transmitted to an operator are reduced and so that its accompanying production of noises is lowered. Thus, the operation feeling of a rotary tool is improved.

On the other hand, when the tool element is clamped between the rigid flange and the rigid lock nut with the center of the tool element being displaced from the center of the spindle, there arises a problem that the tool element bounds against a work and that such a bounding movement is transmitted to the hands of the operator when the tool element is rotated and pressed on the work. With the device of the above publication, since the tool element is movable to some extent in a direction perpendicular to the spindle, the displacement of the center of the tool element may be automatically absorbed, so that the bounding movement can be reduced. Thus, the operation feeling of the rotary tool is improved by the device of the above publication also in this point.

However, with the device of the above publication, since the tool element directly contacts the resilient member, the resilient member tends to be abraded when the tool element is mounted on or removed from the rotary tool. Therefore, the device has a low durability.

SUMMARY OF THE INVENTION

It is, accordingly, an object of the present invention to provide a clamp device for use with a rotary tool which is operable to effectively absorb vibrations of a tool element and which is excellent in durability.

It is another object of the present invention to provide a clamp device for use with a rotary tool which permits a tool element to be easily mounted on and removed from the rotary tool.

According to the present invention, there is provided a device for fixing a tool element to a spindle of a rotary tool, comprising:

a first rotary member and a second rotary member adapted to be mounted on the spindle in a confronting relationship with each other in an axial direction of the spindle, the second rotary member having an abutting surface for abutment of the tool element on the side opposite to the first rotary member;

a resilient member interposed between the first rotary member and the second rotary member; and a tightening member operable to press the tool element on the second rotary member with the first rotary member abutted on a part of the spindle.

The invention will become more apparent from the appended claims and the description as it proceeds in connection with the drawings.

DETAILED DESCRIPTION OF THE EMBODIMENT

An embodiment of the present invention will now explained with reference to the accompanying drawings.

Figure 1:
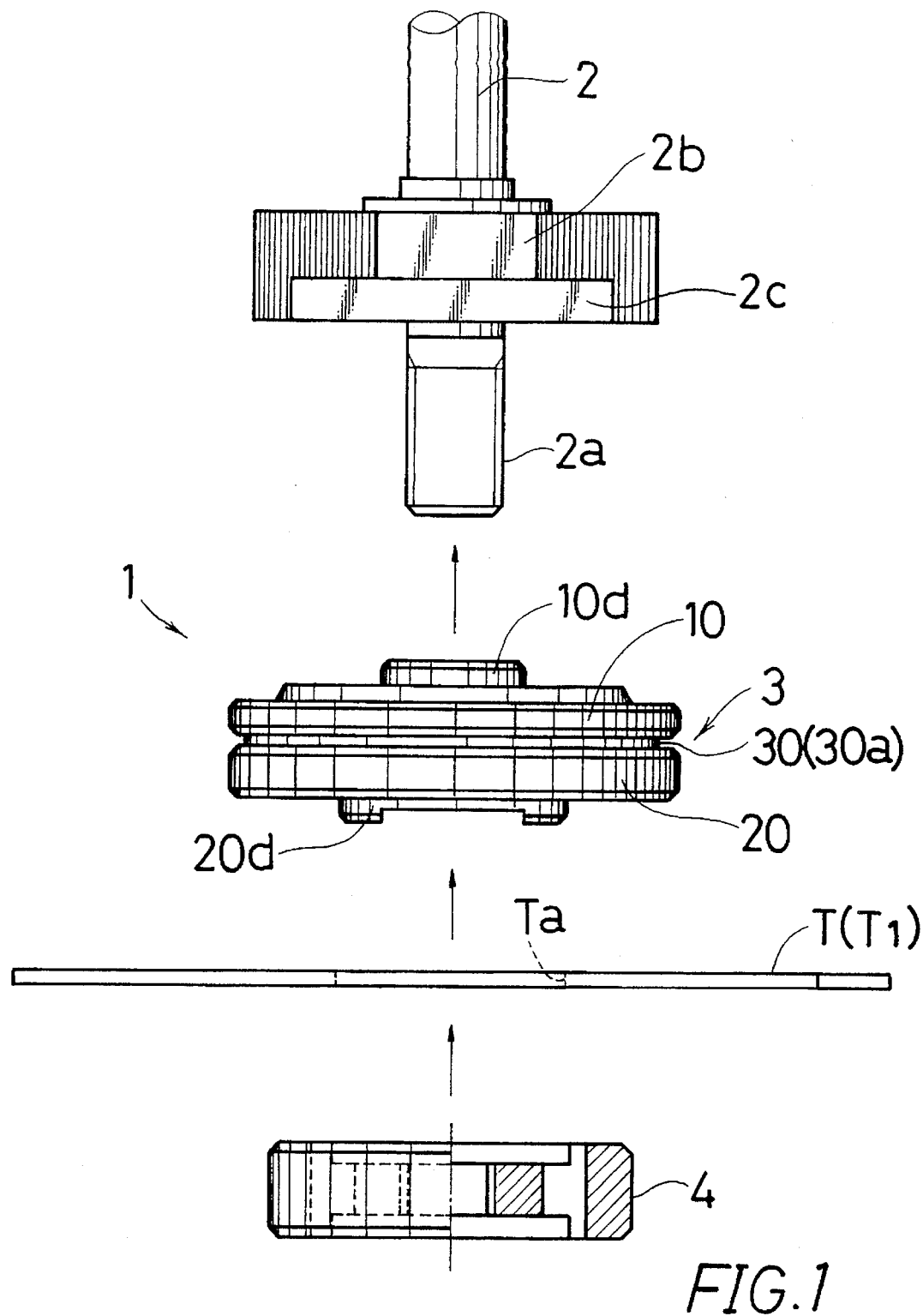
FIG. 1 is an exploded front view of a device for fixing a tool element to a rotary tool according to an embodiment of the present invention.

Referring to FIG. 1, there is shown, in exploded view, a clamp device 1 which is adapted to be mounted on a spindle 2 of a rotary tool such as a grinder, a sander and a polisher. The clamp device I includes a flange assembly 3 and a lock nut 4 which is engaged with a threaded portion 2a formed on one end of the spindle 2. With a tool element T positioned between the flange assembly 3 and the lock nut 4, the lock nut 4 is tightened to clamp the tool element T between the flange assembly 3 and the lock nut 4, so that the tool element T is fixed in position perpendicular to the spindle 2. In addition to the threaded portion 2a, the spindle 2 includes first engaging surfaces 2b and second engaging surfaces 2c (one shown in the drawings, respectively). The first engaging surfaces 2b are adapted for engagement with a spanner for preventing rotation of the spindle 2 during the operation for mounting and removing the tool element T. The second engaging surfaces 2c are two in number and are opposed to each other in a diametrical direction of the spindle 2 for preventing the flange assembly 3 from rotation relative to the spindle 2.

Figure 2:
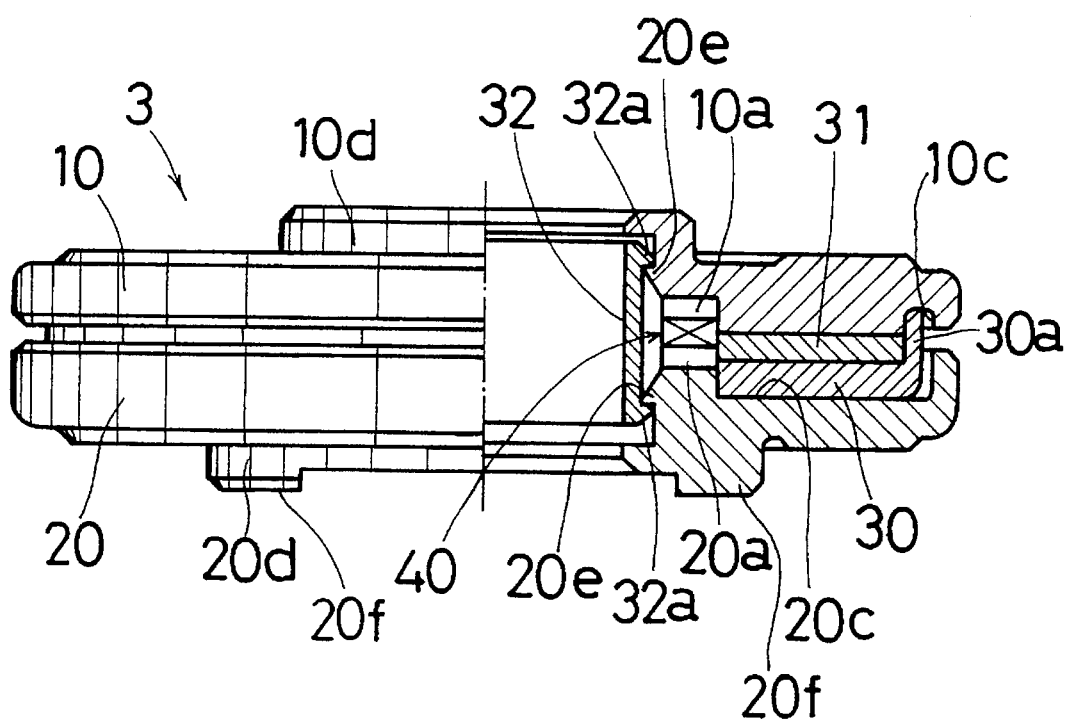
FIG. 2 is a half sectional front view of a flange assembly of the device shown in FIG. 1.

As shown in FIG. 2, the flange assembly 3 includes an upper flange base 10 and a lower flange cover 20 both made of rigid materials. In order to fix the tool element T, the flange base 10 and the flange cover 20 are superposed on each other so as to be assembled into the flange assembly 3. A resilient member 30 and a friction reducing member 31 are superposed on each other and are interposed between the flange base 10 and the flange cover 20.

Figure 3A:
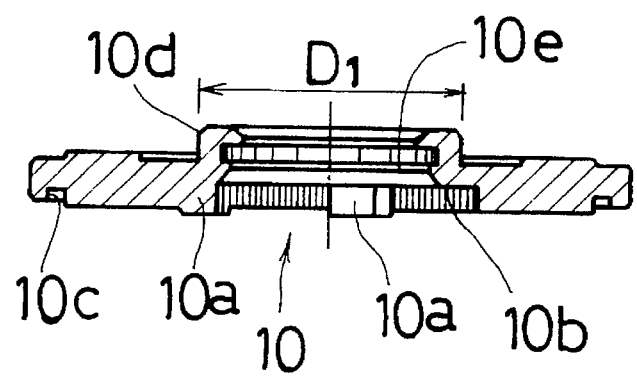
FIG. 3(a) is a sectional view of a flange base of the flange assembly taken along line IIIa—IIIa in FIG. 3(b)
Figure 3B:
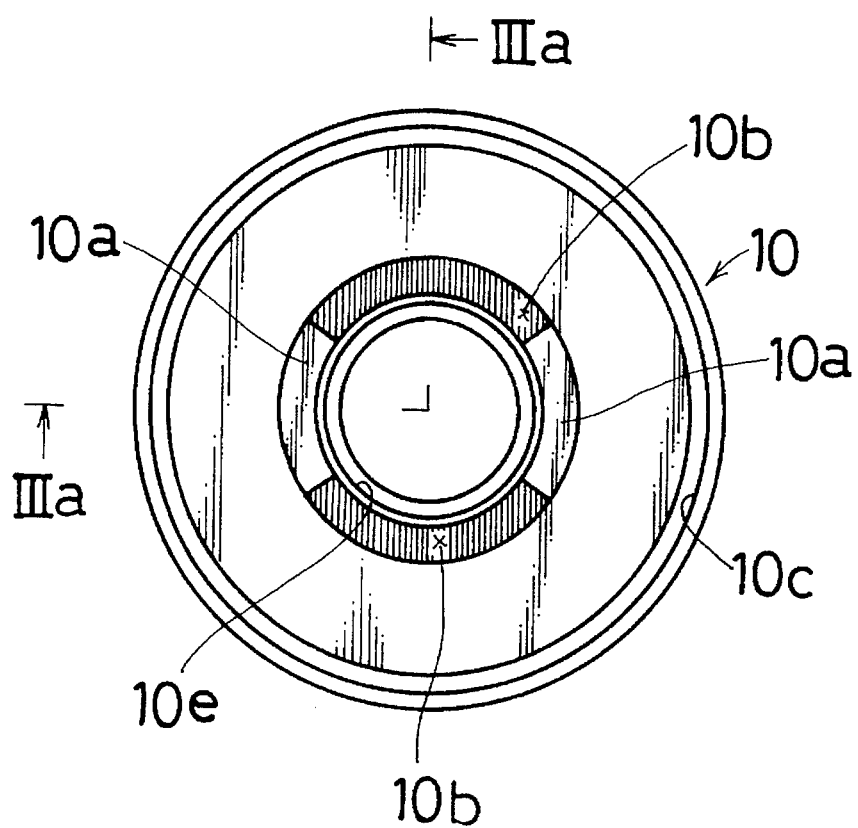
FIG. 3(b) is a bottom view of the flange base.

As shown in FIGS. 3(a) and 3(b), the flange base 10 has a substantially annular flat plate-like configuration and has a central hole through which the threaded portion 2a of the spindle 2 is inserted. As shown in FIG. 3(a), a pair of engaging teeth 10a are formed on a lower surface of the flange base 10 (a surface confronting the flange cover 20). The engaging teeth 10a are positioned on the periphery of the central hole of the flange base 10 and are opposed to each other in a diametrical direction. Each of the engaging teeth 10 extends by an angle of 70° in the circumferential direction, so that a pair of recesses 10b are formed between the engaging teeth 10 in the circumferential direction and extend by an angle of 110°. An annular recess 10c is formed on the lower surface of the flange base 10 at a position adjacent the outer periphery thereof. A boss portion 10d is formed integrally with an upper surface of the flange base 10 and is adapted for insertion into a mounting hole Ta formed in the tool element T. The boss portion 10d has an outer diameter D1 corresponding to the diameter of the mounting hole Ta, so that the tool element T can be positioned coaxially with the boss portion 10d. An annular protrusion 10e is formed on the peripheral surface of the central hole of the flange base 10 and is adapted for engagement with one end of a connection sleeve 32 which will be explained later.

Figure 4A:
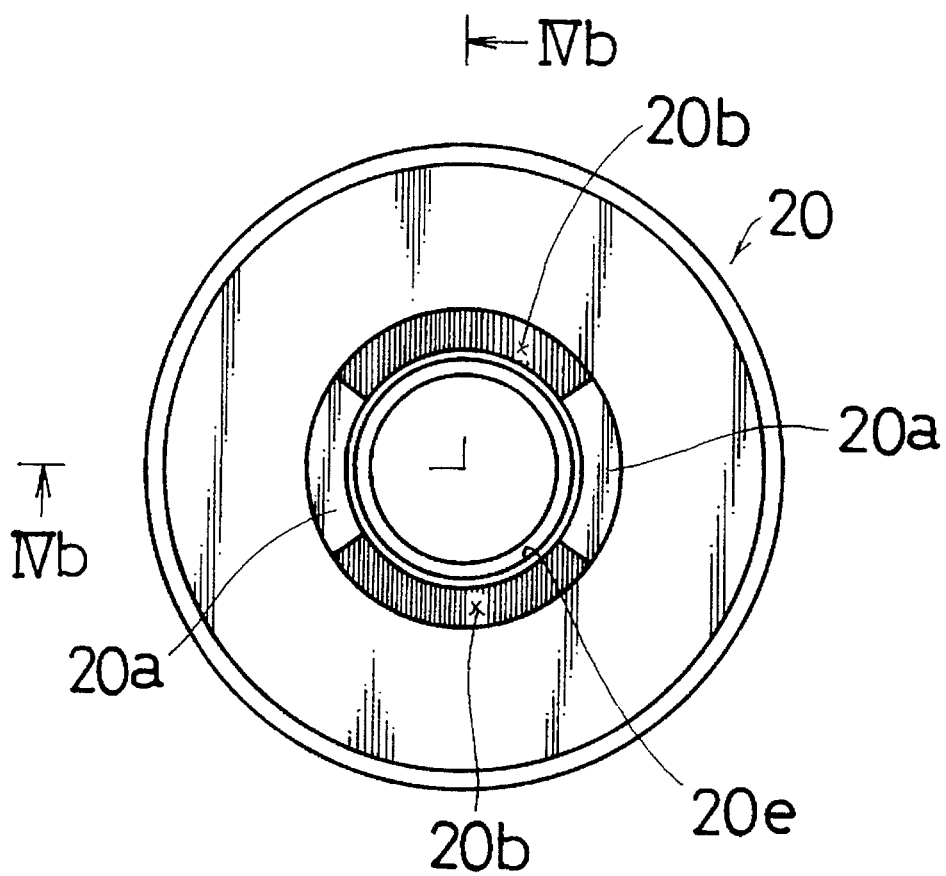
FIG. 4(a) is a plan view of a flange cover of the flange assembly.
Figure 4B:
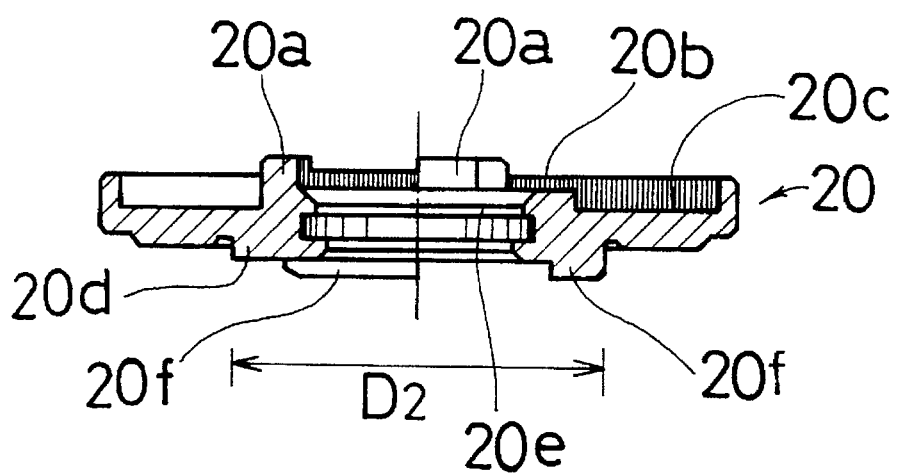
FIG. 4(b) is a sectional view of the flange cover taken along line IVb—IVb in FIG. 4(a)
Figure 5:
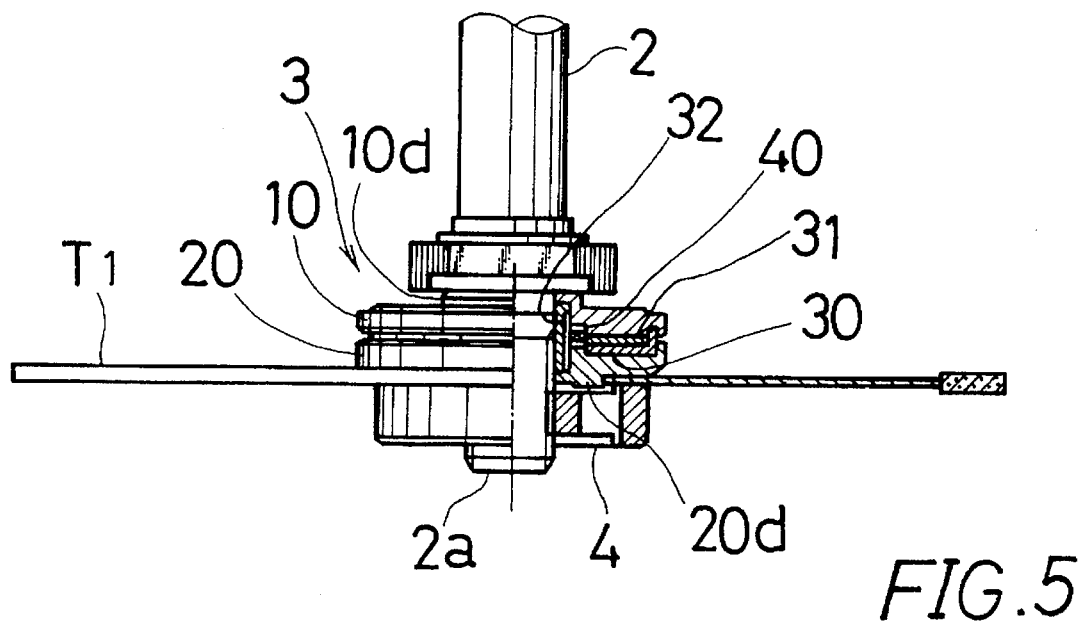
FIG. 5 is a partial sectional view of the device showing the operation for fixing a tool element having a smaller mounting hole.
Figure 6:
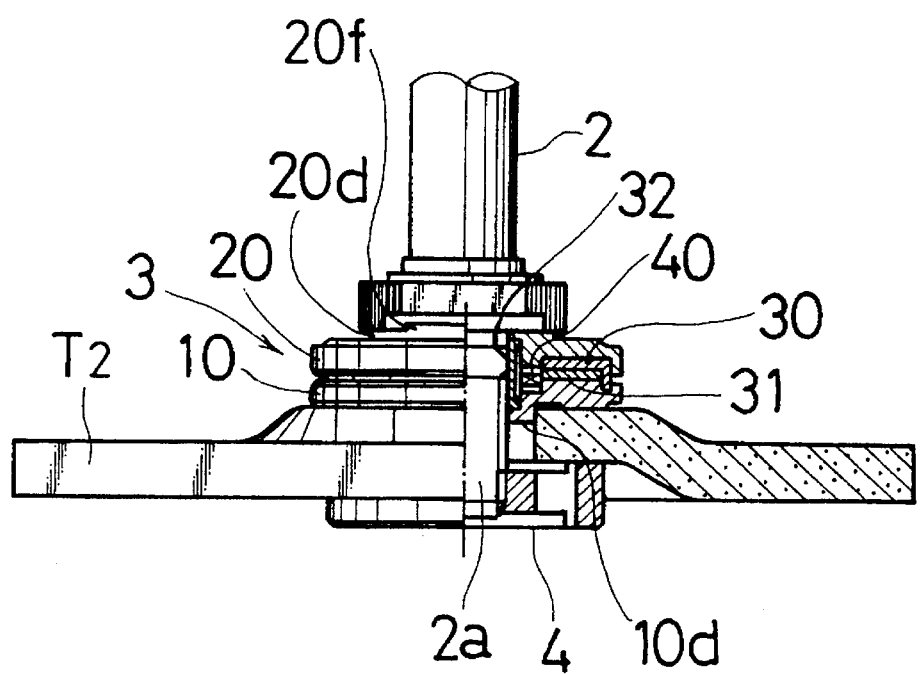
FIG. 6 is a view similar to FIG. 5 but showing the operation for fixing a tool element having a larger mounting hole.

As shown in FIGS. 4(a) and 4(b), the flange cover 20 has a substantially annular flat plate-like configuration and has substantially the same size as the flange base 10. As with the flange base 10, the flange cover 20 has a central hole through which the threaded portion 2a of the spindle 2 is inserted. As shown in FIG. 4(b), a pair of engaging teeth 20a are formed on an upper surface of the flange cover 20 (a surface confronting the flange base 10). The engaging teeth 20a are positioned on the periphery of the central hole of the flange cover 20 and are opposed to each other in a diametrical direction. Each of the engaging teeth 20a extends by an angle of 70° in the circumferential direction, so that a pair of recesses 20b are formed between the engaging teeth 20a in the circumferential direction and extend by an angle of 110°. Thus, the engaging teeth 20a cooperate with the engaging teeth 10a of the flange base 10 to form an engaging mechanism 40 for engagement between the flange base 10 and the flange cover 20 in the rotational direction of the spindle 2. An annular recess 20c is formed on the upper surface of the flange cover 20 so as to receive the resilient member 30. A boss portion 20d is formed integrally with the lower surface of the flange cover 20 and has an outer diameter D2 which is greater than the outer diameter D1 of the boss portion 10d of the flange base 10, so that the boss portion 10d and the boss portion 20d can be adapted to support different tool elements T1 and T2 having different mounting holes Ta as shown in FIGS. 5 and 6. As shown in FIG. 4(b), a pair of stopper protrusions 20f are formed on the lower end of the boss portion 20d and are opposed to each other in the diametrical direction. The stopper protrusions 20f are adapted for receiving a part of the spindle 2 having the second engaging surfaces 2c such that the second engaging surfaces 2c confront their corresponding stopper protrusions 20f. Thus, the flange cover 20 can be prevented from rotation relative to the spindle 2. An annular protrusion 20e similar to the annular protrusion 10e of the flange base 10 is formed on the peripheral surface of the central hole of the flange cover 20 and is adapted for engagement with the other end of the connection sleeve 32.

As shown in FIG. 2, the connection sleeve 32 connects the flange base 10 and the flange cover 20 to each other with the resilient member 30 and the friction reducing member 31 interposed therebetween, so that the flange assembly 3 is assembled. The connection sleeve 32 is inserted through the central holes of the flange base 10 and the flange cover 20. The connection sleeve 32 has an outer surface on which annular protrusions 32a are formed at upper and lower ends thereof for engagement with the annular protrusions 10e and 20e.

In the assembled state of the flange assembly 3, the engaging teeth 10a of the flange base 10 enter their corresponding recesses 20b of the flange cover 20, while the engaging teeth 20a of the flange cover 20 enter their corresponding recesses 10b of the flange base 10. Since each of the engaging teeth 10a and 20a extends in the circumferential direction by an angle of 70° while each of the recesses 10b and 10b extends in the circumferential direction by an angle of 110°, the flange base 10 and the flange cover 20 is rotatable relative to each other by an angle of 40°.

The resilient member 30 has a flat annular configuration and is made of suitable material such as a rubber. As shown in FIG. 2, the outer peripheral portion 30a of the resilient member 30 is bent in a direction toward the flange base 10 and is inserted into the annular recess 10c of the flange base 10. The friction reduction member 31 has a thin annular plate-like configuration and is made of a rigid material. The upper surface of the friction reduction member 31 is coated with a fluoroplastic coating or a molybdenum coating. The friction reduction member 31 is interposed between the resilient member 30 and the flange base 10, so that the upper surface of the friction reduction member 31 contacting the flange base 10 serves as a slide surface between the flange base 10 and the flange cover 20. The upper surface or the slide surface of the friction reduction member 31 is isolated from the outside by the peripheral portion 30a of the resilient member 30, so that dust is prevented from entering the flange assembly 3.

As described above, with this embodiment, the flange assembly 3 can be adapted to fix two kinds of tool elements T1 and T2 having mounting holes Ta of different diameters. The tool element T1 having a larger mounting hole Ta may be a diamond grinding wheel (see FIG. 5), while the tool element T2 having a smaller mounting hole Ta may be an offset grinding wheel (see FIG. 6).

In order to fix the tool T1 having the larger mounting hole Ta, as shown in FIGS. 1 and 5, the flange assembly 3 is fitted on the spindle 2 with the flange base 10 positioned upwardly of the flange cover 20 such that the threaded portion 2a is inserted into the flange assembly 3 from the side of the flange base 10. Thus, the boss portion 20d of the flange cover 20 is positioned on the lower side thereof. Then, the tool element T1 is brought to abut on the lower surface of the flange cover 20 with the boss portion 20d fitted into the mounting hole Ta. Thereafter, the lock nut 4 is brought to engage the threaded portion 2a and is tightened to fix the tool element T1 in position as shown in FIG. 5.

On the other hand, in order to fix the tool T2 having the smaller mounting hole Ta, the flange assembly 3 is fitted on the spindle 2 with its position inverted from the position for fixing the tool T1. Thus, the threaded portion 2a is inserted into the flange assembly 3 from the side of the flange cover 20, so that the boss portion 10d of the flange base 10 is positioned on the lower side thereof. Thereafter, the lock nut 4 is brought to engage the threaded portion 2a and is tightened to fix the tool element T2 in position as shown in FIG. 6.

When the tool element T (T1 or T2) is thus fixed to the spindle 2, vibrations which may be produced during rotation of the tool element T can be absorbed by the resilient member 30 which is interposed between the flange base 10 and the flange cover 20, so that the vibrations which may be transmitted to the spindle 2 and to hands of the operator can be reduced. Since the resilient member 30 does not directly abut on the tool element T, the resilient member 30 is not abraded by the tool element T when the lock nut 4 is tightened or released to fix the tool element T to the spindle 2 or to remove the same. Thus, the resilient member 30 can maintain its vibration absorption function during a long period of service and has an excellent durability.

Further, with the provision of the resilient member 30 between the flange base 10 and the flange cover 20, the tool element T is permitted to move in both axial and diametrical directions of the spindle 2 through resilient deformation of the resilient member 30. This may absorb the bounding movement of the tool element T which may be caused when the tool element T is applied on the work. Further, since the tool element T is permitted to move in the diametrical direction, the displacement of the center of the tool element T from the center of the spindle 2 can be absorbed. In a practical operation, such displacement of the center of the tool element T may be absorbed due to wearing of the tool element T during the abrading or cutting operation. Since the bounding movement of the tool element T is thus reduced and the displacement of the center of the tool element T is thus absorbed, the tool element T may reliably continuously abut on the work during the abrading operation or the cutting operation, so that an excellent abrading or cutting operation can be performed and so that the operability of the rotary tool can be improved.

The connecting sleeve 32 connecting the flange base 10 and the flange cover 20 to each other serves to permit the flange assembly 3 to be conveniently handled. In addition, as with the peripheral portion 30a of the resilient member 30, the connecting sleeve 32 serves to prevent dust from entering the flange assembly 3. However, the vibration reducing function as well as an assisting function for releasing the lock nut 4 which will be explained later may be performed without incorporating the connection sleeve 32.

Although the frictional resistance between the lock nut 4 and the tool element T is considerably large when the lock nut 4 is tightened to fix the tool element T, the frictional resistance between the flange base 10 and the flange cover 20 or the frictional resistance between the flange base 10 and the friction reduction member 31 is very small. Therefore, when a rotational torque is applied to the lock nut 4 in a direction to release the same for removing the tool element T, for the first time, the flange base 10 and the flange cover 20 are rotated relative to each other due to a smaller rotational torque at a mating surface between the friction reduction member 31 and the flange base 10. Such relative rotation between the flange base 10 and the flange cover 20 is permitted by a maximum angle of 40°, and during this relative rotation, the lock nut 4 is not rotated relative to the tool element T. However, the lock nut 4 is rotated relative to the spindle 20 in the direction to be released, so that the frictional resistance between the lock nut 4 and the tool element T is reduced. Therefore, further rotation of the lock nut 4 for releasing the same can be performed by a smaller rotational torque. Thus, even if the tool element T has been fixed by a greater tightening force by the lock nut 4 or even if the lock nut 4 has been further tightened because of slippage of the tool element T during the abrading or cutting operation, the lock nut 4 can be released by a smaller force through rotation of the lock nut 4 relative to the spindle 2 due to the rotation between the flange base 10 and the flange cover 20 when the lock nut 4 is rotated for removing the tool element T. Therefore, the operator can easily perform an operation for changing the tool element T to another one.

Although the flange base 10 and the flange cover 20 are rotatable to each other by the maximum angle of 40° as described above, they are rotatable together upon engagement of the engaging teeth 10a with the engaging teeth 20a when the tool element T is mounted or when the lock nut 4 is tightened. Therefore, the rotation of the spindle 2 can be reliably transmitted to the tool element T.

In the above embodiment, the engaging teeth 10a of the flange base 10 and the engaging teeth 20a of the flange cover 20 are two in number, respectively, and each of the engaging teeth 10a as well as each of the engaging teeth 20a extends by an angle of 70° in the circumferential direction. However, the number of the engaging teeth 20a and 20b as well as the angular range of them in the circumferential direction is not limited to that disclosed in this embodiment but may be selectively determined such that the flange base 10 and the flange cover 20 are permitted to rotate relative to each other by a predetermined angle and are rotatably together by an appropriate engaging mechanism such as a combination of a pin and an elongated recess in the circumferential direction.

Additionally, even if the flange base 10 and the flange cover 20 is not permitted to rotate relative to each other (the friction reducing member 31 is not required in this case), the fixing device 1 may attain the main object of the present invention for improving the durability of the resilient member 30 with the vibration absorption function or the bounding movement absorption function of the resilient member 30 properly maintained. Further, the bent peripheral portion 30a of the resilient member 30 is not essential to attain the main object, and the bent peripheral portion 30a may be replaced by a separate seal member.

The friction reducing member 31 may be eliminated if the surface of the flange base 20 contacting the resilient member 30 is coated with a fluoroplastic so as to reduce the frictional resistance between the flange base 20 and the resilient member 30. Further, such a coating on the flange base 20 may be incorporated in addition to the friction reduction member 31.

Although, in the state shown in FIG. 6, the flange cover 20 is prevented from rotation relative to the spindle 2 through abutment of the stopper protrusions 20f on the second engaging surfaces 2c of the spindle 2, the flange cover 20 may be fixed in position relative to the spindle 2 by the tightening force of the lock nut 4 even if the flange cover 20 does not include the stopper protrusions 20f.

While the invention has been described with reference to a preferred embodiment thereof, it is to be understood that modifications or variation may be easily made without departing from the spirit of this invention which is defined by the appended claims.

What is claimed is:

1. A device for fixing a tool element to a spindle of a rotary tool, comprising:

a first rotary member adapted to be mounted on the spindle, a second rotary member adapted to be mounted on the spindle in confronting relationship with said first rotary member in an axial direction of the spindle, said second rotary member having an abutting surface for abutment of the tool element on the side opposite to said first rotary member;

a resilient member interposed between said first rotary member and said second rotary member;

tightening means operable to press a tool element against said second rotary member with said first rotary member abutted on an engagement portion of the spindle;

said resilient member being resiliently compressed in the axial direction between said first rotary member and said second rotary member when the tightening means is operated to fix the tool element;

engaging means disposed between said first rotary member and said second rotary member, said engaging means forcing said second rotary member to rotate together with said first rotary member in the rotational direction of the spindle;

said engaging means permits rotation of said second rotary member relative to said first rotary member by a predetermined angle, and further including friction reducing means disposed between said resilient member and at least one of said first and second rotary member for reducing frictional force therebetween; and said resilient member has a peripheral portion extending radially outwardly from the friction reducing means so as to cover the friction reducing means from the outside.

2. A device for fixing a tool element to a spindle of a rotary tool, comprising:

a first rotary member adapted to be mounted on the spindle, a second rotary member adapted to be mounted on the spindle in confronting relationship with said first rotary member in an axial direction of the spindle, said second rotary member having an abutting surface for abutment of the tool element on the side opposite to said first rotary member;

a resilient member interposed between said first rotary member and said second rotary member;

tightening means operable to press a tool element against said second rotary member with said first rotary member abutted on an engagement portion of the spindle;

said resilient member being resiliently compressed in the axial direction between said first rotary member and said second rotary member when the tightening means is operated to fix the tool element;

engaging means disposed between said first rotary member and said second rotary member, said engaging means forcing said second rotary member to rotate together with said first rotary member in the rotational direction of the spindle; and said engaging means includes at least one first tooth and at least one second tooth formed on said first rotary member and said second rotary member on the sides confronting each other, said resilient member is positioned adjacent and radially outwardly of said at least first and second tooth.

3. A device for fixing a tool element to a spindle of a rotary tool, comprising:

a first rotary member adapted to be mounted on the spindle, a second rotary member adapted to be mounted on the spindle in confronting relationship with said first rotary member in an axial direction of the spindle, said second rotary member having an abutting surface for abutment of the tool element on the side opposite to said first rotary member;

a resilient member interposed between said first rotary member and said second rotary member;

tightening means operable to press a tool element against said second rotary member with said first rotary member abutted on an engagement portion of the spindle;

said resilient member being resiliently compressed in the axial direction between said first rotary member and said second rotary member when the tightening means is operated to fix the tool element;

said first rotary member includes a first boss portion for insertion into a mounting hole formed in a tool element;

said second rotary member includes a second boss portion for insertion into the mounting hole of a tool element;

said first boss portion and said second boss portion have different outer diameters; so that two different tool elements having mounting holes of different diameters can be fixed to the spindle by changing the positions of the first and second rotary members with respect to an engagement portion of the spindle.

* * * * *